Sept. 8, 1942.  F. YANCHEK  2,295,022

UNIVERSAL DRILL JIG

Filed Nov. 9, 1939  7 Sheets-Sheet 1

Frank Yanchek
INVENTOR

BY Rob Meyer
ATTORNEY

Sept. 8, 1942.                F. YANCHEK                2,295,022
                            UNIVERSAL DRILL JIG
                           Filed Nov. 9, 1939                7 Sheets-Sheet 2

Frank Yanchek
INVENTOR

BY
ATTORNEY

Sept. 8, 1942.  F. YANCHEK  2,295,022
UNIVERSAL DRILL JIG
Filed Nov. 9, 1939  7 Sheets-Sheet 4

Frank Yanchek
INVENTOR
BY [signature]
ATTORNEY

Sept. 8, 1942.　　　　F. YANCHEK　　　　2,295,022
UNIVERSAL DRILL JIG
Filed Nov. 9, 1939　　　　7 Sheets-Sheet 5

Frank Yanchek
INVENTOR
BY
ATTORNEY

Sept. 8, 1942.  F. YANCHEK  2,295,022
UNIVERSAL DRILL JIG
Filed Nov. 9, 1939  7 Sheets-Sheet 6

Frank Yanchek
INVENTOR
BY
ATTORNEY

Patented Sept. 8, 1942

2,295,022

UNITED STATES PATENT OFFICE 2,295,022

UNIVERSAL DRILL JIG

Frank Yanchek, Maplewood, N. J.

Application November 9, 1939, Serial No. 303,580

31 Claims. (Cl. 77—64)

This invention relates to jigs, and more particularly to a universal drilling jig for accurately positioning work to be drilled.

An object of the present invention is to provide a drill jig whereby a piece to be drilled may be accurately and positively set and centered and moved to definite positions for drilling a series of holes therein, in one or more circles, without detachment of the work from the jig and without replacement or alteration of the index plates or means of the jig, and one which will eliminate all lay-out work on the piece to be drilled, together with its expense and inaccuracies.

The primary object of the present invention is to provide a drilling jig for use with any conventional or approved type of drilling machine, which is adjustable in numerous ways for holding, centering and positioning various sizes and types of pieces to be worked upon or drilled, thereby eliminating the necessity of the construction of special jigs for each drilling job as well as eliminating the necessity for manually laying out the drilling centers on the work.

The present practice in machine shops, which is both expensive and time absorbing, is either to make drill jigs for each particular drilling job, where any quantity of pieces are to be drilled, or when only one or a few pieces are to be drilled, to lay out, manually, the centers of the holes to be drilled. The construction of drilling jigs for each drilling job is not only initially expensive and time absorbing, but it entails additional expense of tool room storage and care, while the method of manually laying out the drill centers, though eliminating the expense of construction of the jigs and their storage, is in itself a more expensive procedure owing to the wages paid such lay out men and the time it takes them to lay out each individual piece to be drilled. Further, the method of manually laying out the work frequently results in inaccuracies through the failure of the drilling machine operator to accurately follow the center punch marks of the lay out man or through slight slippage of the center punch itself.

The present invention comprises a universal drill jig which eliminates both the use of individual drill jigs for each job and the manual lay out work, and one which is equally applicable for use in drilling one or any number of pieces with equal accuracy, regardless of the pattern of the holes to be drilled.

A further object of the present invention is to provide a universal drill jig which precludes error in the drilling of the holes, once it has been set to carry out a particular pattern or spacing of the holes. It provides visible signal means for indicating when the piece of work is properly set for drilling.

A further object of the present invention is to provide a drill jig which will accurately hold and position pieces of irregular contour for accurate drilling, and one which embodies a plurality of index rings and cooperating elements, whereby any number of holes, within predetermined limits, may be accurately located in one or more bolt circles, with the holes in the different circles at various angle positions in regard to the holes in other circles, and the rings of holes at any desired distance apart, all of such relative positions being accurately determined by the universal drill jig without any lay out work on the piece to be drilled.

With these and other objects in view, as may appear from the accompanying specification, the invention consists of various features of construction and combination of parts, which will be first described in connection with the accompanying drawings, showing a universal drill jig of the preferred form embodying the invention, and the features forming the invention will be specifically pointed out in the claims.

In the drawings:

Figure 13—A is a horizontal section on the line 13—A—13—A of Figure 4.

Referring more particularly to the drawings, the improved universal drill jig comprises a housing 1, which has attaching ears 2 projecting radially from its base, being means for attaching the universal drill jig to the table of any approved type of drilling machine (not shown). The housing 1 is held stationary upon the table of a drilling machine, and it carries a work table 3 and cooperating mechanism, for rotary movement relative to the stationary housing.

The work carrying table 3 is supported upon the top of a cylinder 4, which is in turn rotatably supported on the stationary housing 1 by means of the annular shoulder 5 thereon and the supporting ring 6. The supporting ring 6 is detachably connected to the rotary cylinder and rests upon an inturned annular flange 7 formed on the stationary housing 1.

The work table 3 has a depending annular flange 8 formed thereon which engages about the outer surface of the upper end of the rotary cylinder 4. The depending flange 8 has a series of gear teeth or a rack 9 formed on a part of its under surface, which teeth mesh with a pinion 10 carried by an annular ring 11. The ring 11 is supported for rotary movement independently of the cylinder 4 and the table 3 upon rotation of the pinion 10, and for rotary movement with the cylinder 4 and the table 3 when the table is rotated for positioning a piece of work to be drilled, as will be hereinafter more fully described.

The pinion carrying shaft 12 has a wrench head 13 formed on its outer end, which is adapted to be engaged by a suitable wrench for rotating the ring 11 independently of the table 3. When a piece of work to be drilled is placed upon the table 3, it is properly centered by rotating the ring 11 through the medium of the pinion 10 and shaft 12, causing the centering members 14 to operate.

Figure 4:
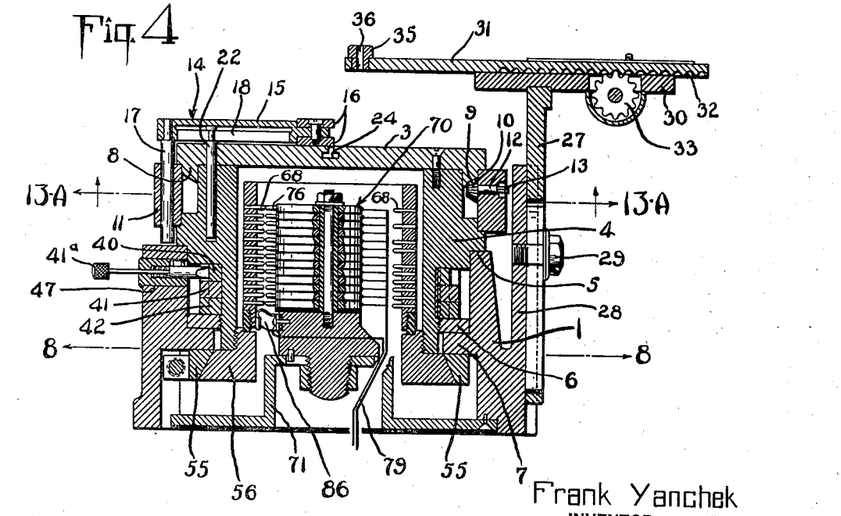
Figure 4 is a vertical section through the universal drill jig taken on the line 4—4 of Figure 3.

The centering members 14 include arms 15, which carry work engaging rollers 16 on their inner ends and have depending pins 17 rigidly attached to their outer ends. The pins 17 extend slideably through suitable holes in the ring 11 for forming pivots for the arms 15. Said arms 15 have longitudinally extending grooves or recesses 18 in their under surfaces, the upper-most portions of which are channeled along their sides and outer end, as shown at 19. These channels 19 open into an intersecting opening 20 at the inner ends of the grooves 18, so as to permit the insertion of the flanged heads 21 of pins 22 into the grooves or recesses 18, with the flanges 23 riding in the channels 19, to prevent accidental removal of the pins 22 from the grooves 18 and to maintain the proper connection between the arms 15 and the pins 22. Said pins 22 are slideably inserted into holes drilled in the table 3 and into the cylinder 4, as clearly shown in Figure 4 of the drawings. Consequently they are stationary and form fulcrum anchors for the arms 15 when the ring 11 is rotated by means of the pinion 9. Thus as the ring 11 is rotated through the medium of the pinion 9, all of the arms 15 of the various centering devices will move in unison, moving their inner ends and the work-engaging rollers 16 which are attached thereto uniformly towards or away from the vertical axis or center of the table 3, according to the direction in which the pinion 9 is rotated. These centering arms 15, with their rollers 16, engage the circular perimeter of the piece of work to be drilled, and since they all move uniformly, will accurately center the piece to be drilled upon the table 3, and will grip the piece with sufficient friction to securely hold it in place during the clamping operation.

Figures 12, 13, 14:
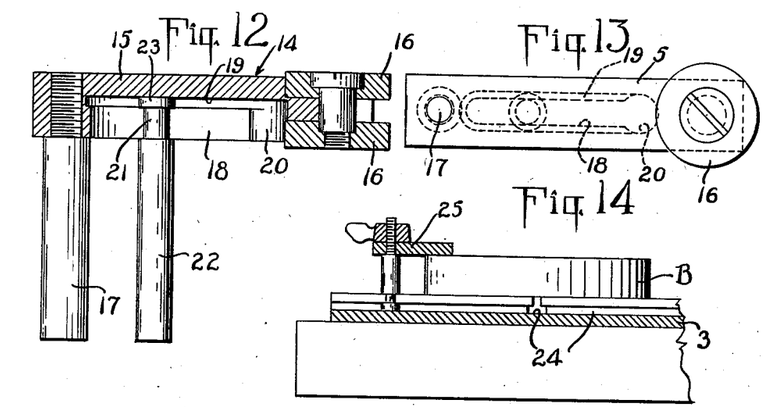
Figure 12 is a detail view partly in section of the work centering structure.
Figure 13 is a top plan of one of the work centering members.
Figure 14 is a view partly in section illustrating the manner of clamping the work on the table of the universal drill jig.
Figure 13:
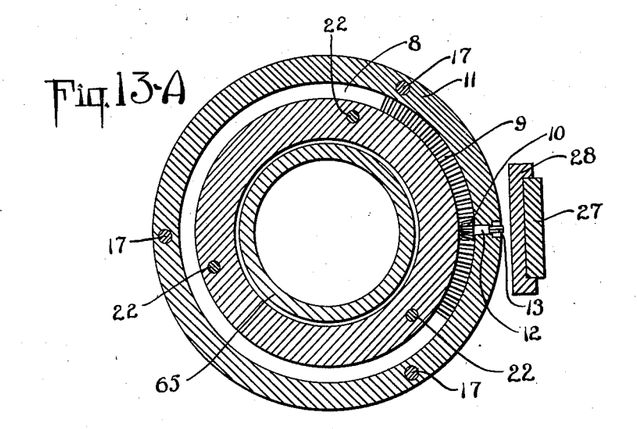

The table 3 is provided with a series of T-grooves 24 which radiate from its vertical axis and form holding guideways for any suitable type of clamps, such as shown at 25 in Figure 14, which securely clamp the piece B in centered position on the table 3. It is to be understood that the rollers 16 are rotatably carried by the arms 15, and that while three of the centering structures 14 are shown in the drawings and is a preferred number to be employed, any number of such centering structures may be employed without departing from the spirit of the present invention.

A drill guide structure is carried by the stationary housing 1 for guiding the drill and determining its position radially of the axis of the table 3 upon which the work to be drilled is centered.

The drill guiding structure includes a slide 27, which is slidably carried by a stationary guide 28 formed on the housing 1. The slide 27 is held in vertically adjusted positions by means of the clamping screw 29. A horizontal guide 30 is rigidly carried by the upper end of the vertical slide 27, and it adjustably supports a horizontal slide 31. The latter horizontal slide 31 has a rack 32 formed on its under surface, which rack meshes with a pinion 33, rotatably carried by the guide 30 and having a suitable hand wheel 34 connected thereto for rotating the pinion 33 to move the slide 31 relative to the table 3. The inner end of the slide 31 carries a drill guiding bushing 35, which is provided with an opening 36 through which the drill employed for drilling the piece is passed. The bore 36 of the bushing 35 is of course of the proper size to receive therethrough the drill used, and this bushing 35 is interchangeable so that it may be changed at will in accordance with the size of the hole to be drilled and the drill used. The slide 31 has a scale 37 thereon, which cooperates with an indicator 38 on the guide 30, permitting accurate positioning of the drill guiding bushing 35 in various positions radially of the axis of the table 3, depending upon the radius of the circle bisecting the centers of the holes to be drilled in the piece B.

If it is desired, a vernier of approved construction may be employed in connection with the slide 31 to permit more accurate setting of the slide. A lock screw 39 is carried by the guide 30 for locking the slide 31 in adjusted positions.

Figure 9:
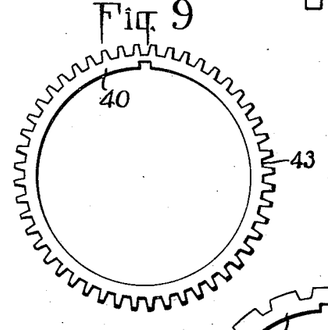
Figures 9, 10 and 11 are plan views of the index rings employed in the universal drill jig.
Figure 10:
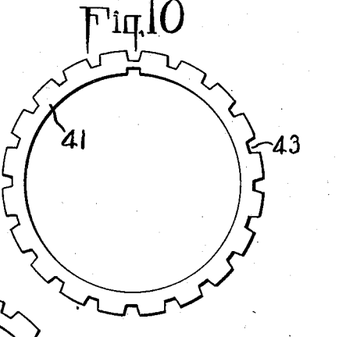
Figure 11:
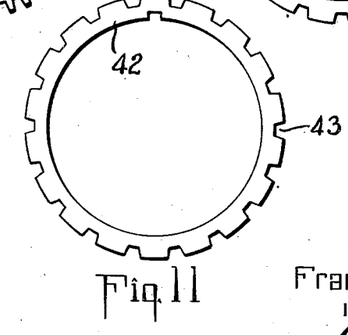

After the piece of work has been clamped on the table 3, the rotary cylinder 4 is rotated for moving the piece of work into the various positions for drilling the holes in said piece. Said cylinder 4 has a series of index rings mounted thereon and keyed thereto for rotation with the cylinder. In the drawings three such index rings are shown, namely the index rings 40, 41 and 42 (see Figures 9, 10 and 11). These index rings have a series of notches 43 cut in their perimeters. As shown in Figures 9, 10 and 11, the ring 40 has forty-eight notches cut in its perimeter, the ring 41 has twenty notches in its perimeter, while ring 42 has eighteen notches in its perimeter. These various notches 43 are cut to the maximum degree of accuracy and determine the various positions of the rotary cylinder or turret 4, depending upon the number and location of the holes to be drilled in the piece of work on the table 3. The rings 40, 41 and 42 are superimposed one above the other, as clearly shown in Figure 4 of the drawings, and are held from longitudinal slippage on the cylinder or turret 4 by the supporting or clamping ring 6.

A locking pin structure is carried by the stationary housing 1 for each of the rings 40, 41 and 42. These locking pin structures, generically indicated at 40a, 41a, and 42a, each comprise a cylindrical housing 46, inserted in a suitable opening 47 drilled laterally through the stationary housing 1. The cylindrical housings 46 are drilled to receive the locking plungers 47, the inner ends of which are wedge shaped, as shown at 48, and accurately fit the notches 43 cut in the respective index rings. The locking plungers 47 have pins or handles thereon, indicated at 49, which project out of the housing 46, permitting the withdrawing of the wedge shaped ends 48 from the notches 43. The plungers 47 are urged inwardly for engagement in the notches 43 by suitable springs 50, and are guided and held against rotation by locking pins 51, which ride in slots 52 in the housing 46. The pins 51 are moved into the transversely extending inner ends 53 of the slots 52 to lock the plungers 47 in their outer positions, permitting the unimpeded rotation of the index rings and the cylinder or turret 4 to which they are attached. Thus adjustment of the position of the table 3 and the work carried by it is permitted.

Locking means are provided for locking the cylinder or turret 4 and table 3 in adjusted positions other than the setting plungers 47 and the index ring notches 43. To relieve these plungers 47 and notches 43 of the stress and subsequent wear on their engaging surfaces which would be occasioned by the drilling operation, a split brake ring 55 is provided, the inner surface of which is tapered and engages the outer tapered surface of the brake ring 56, which is attached to the lower end of the turret or cylinder 4. The split brake ring 55 is moved into and out of clamping and braking engagement with the cylinder carried brake ring 56 by means of a suitable actuating rod 57 and handle 58.

While in the drawings and in the foregoing description the various index rings 40, 41 and 42 are shown and described as provided with a fixed number of periferal notches, it is to be understood that the number of notches in the rings as well as the number of rings employed may be varied without departing from the spirit of the present invention, depending upon the degree of adjustment desired in the universal drill jig. With the number of rings and the number of notches in the respective rings as shown and described above, there would be no need to change the index rings on the jig to drill the most universally or commonly employed number of holes, since with those shown, indexing or positioning of the work for drilling from two to twenty-four holes in any one bolt circle of uniform radius may be obtained, and of course by adjustment of the drill gude 31 any number of circles or sets of holes embodying any number of holes from two to twenty-four may be drilled without changing or replacing any parts of the jig and without changing the position of the piece to be drilled in its place upon the jig table 3.

It is desirable in a drill jig of the type just described to provide some means for definitely indicating when the table 3 and the turret or cylinder 4 have been rotated the proper distance for the accurate positioning of the work for the drilling of the holes, subsequent to the drilling of the first hole, so as to preclude any chance of error in the drilling. The accuracy of the setting is provided by means of the index rings 40, 41 and 42 and their cooperating index pins 40a, 41a and 42a. While any suitable type of mechanical or electric indicating means may be provided with the mechanism just described without departing from the spirit of the present invention, the present invention embodies a novel type of electrically actuated, switch controlled indicating means particularly adaptable for use in connection with the various other features of the universal drill jig of the present invention.

Figure 5:
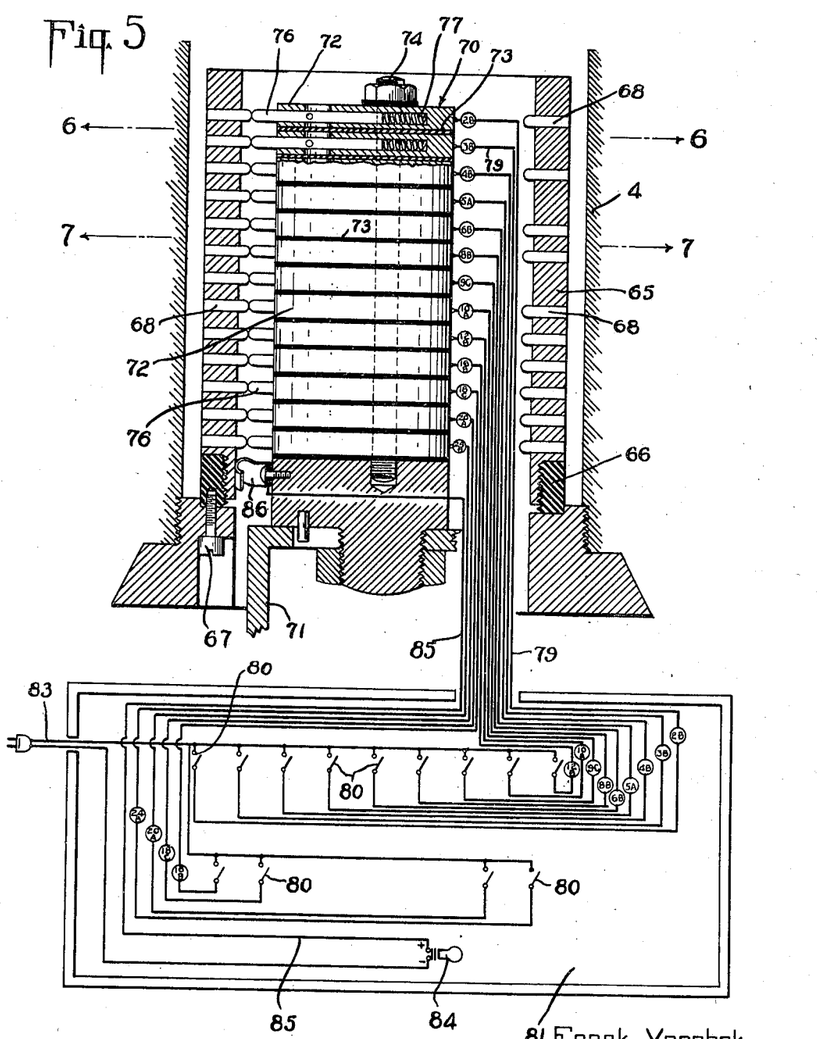
Figure 5 is a diagrammatic view showing a vertical section through a part of the universal drill jig and illustrating the electrical control feature of the jig.

The cylinder or turret 4 has an inner indicating cylinder 65 detachably connected thereto through the medium of an insulating ring 66 and suitable machine screws 67. The indicating cylinder 65 carries a series of sets of suitable contact pins 68 on its inner surface, having their tips projecting inwardly from the inner wall of the cylinder. In a drill jig having index rings as heretofore described, viz. index rings 40, 41 and 42, notched as previously described (see Figs. 9, 10 and 11), there will be thirteen sets or circles of the indicating contact pins 68, each set comprising a different number of pins 68, and each set being spaced from its adjacent set, as clearly shown in the diagrammatic Figure 5 of the drawings and in Figure 4 of the drawings. These various sets or circles of pins are arranged as follows:

The 1st set comprises 2 pins equally spaced about the inner wall of the cylinder (top row).

Figures 6, 15, 16:
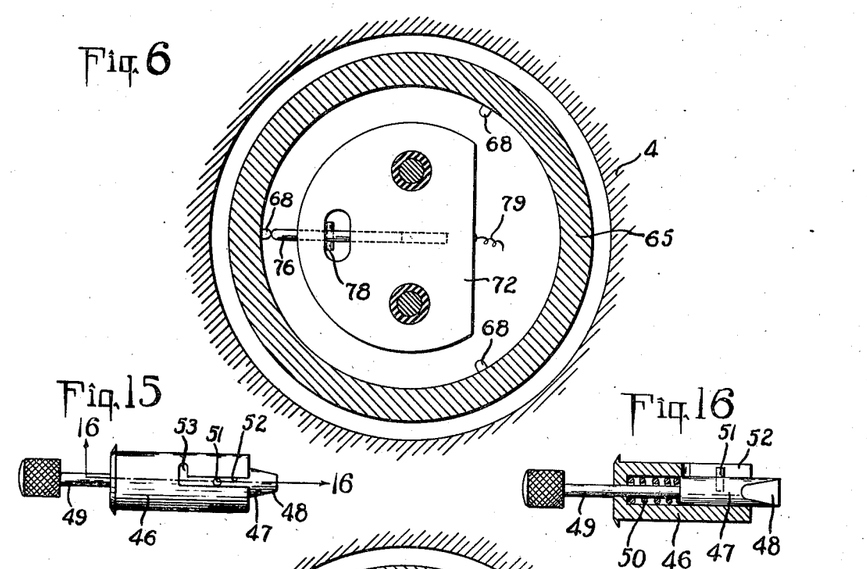
Figure 6 is a fragmentary horizontal section through the universal drill jig taken on the line 6—6 of Figure 5.
Figure 15 is a side elevation of the setting or holding member which cooperates with the index rings.
Figure 16 is a longitudinal section on the line 16—16 of Figure 15.

The 2nd set comprises 3 pins equally spaced about the inner wall of the cylinder (see Fig. 6 of the drawings).

The 3rd set comprises 4 pins equally spaced about the inner wall of the cylinder.

The 4th set comprises 5 pins equally spaced about the inner wall of the cylinder.

The 5th set comprises 6 pins equally spaced about the inner wall of the cylinder.

Figure 7:
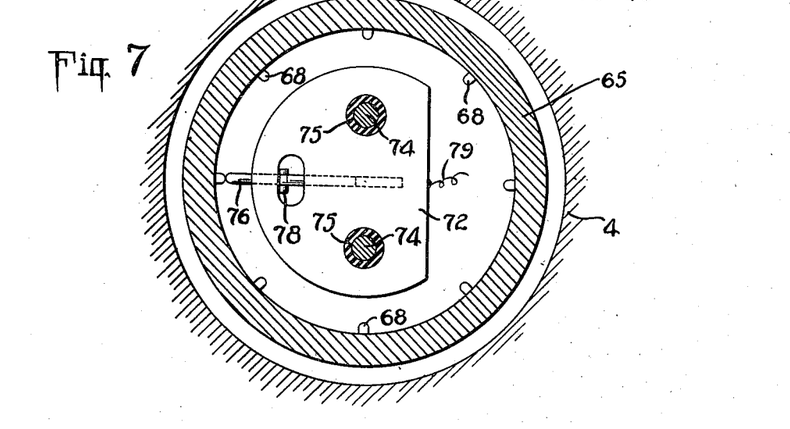
Figure 7 is a horizontal section taken on the line 7—7 of Figure 5.
Figure 8:
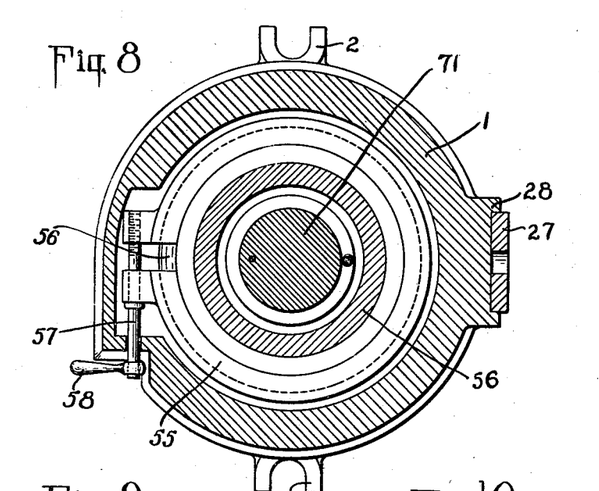
Figure 8 is a horizontal section taken on the line 8—8 of Figure 4.

The 6th set comprises 8 pins equally spaced about the inner wall of the cylinder (see Fig. 7 of the drawings).

The 7th set comprises 9 pins equally spaced about the inner wall of the cylinder.

The 8th set comprises 10 pins equally spaced about the inner wall of the cylinder.

The 9th set comprises 12 pins equally spaced about the inner wall of the cylinder.

The 10th set comprises 16 pins equally spaced about the inner wall of the cylinder.

The 11th set comprises 18 pins equally spaced about the inner wall of the cylinder.

The 12th set comprises 20 pins equally spaced about the inner wall of the cylinder.

The 13th set comprises 24 pins equally spaced about the inner wall of the cylinder.

Figure 1:
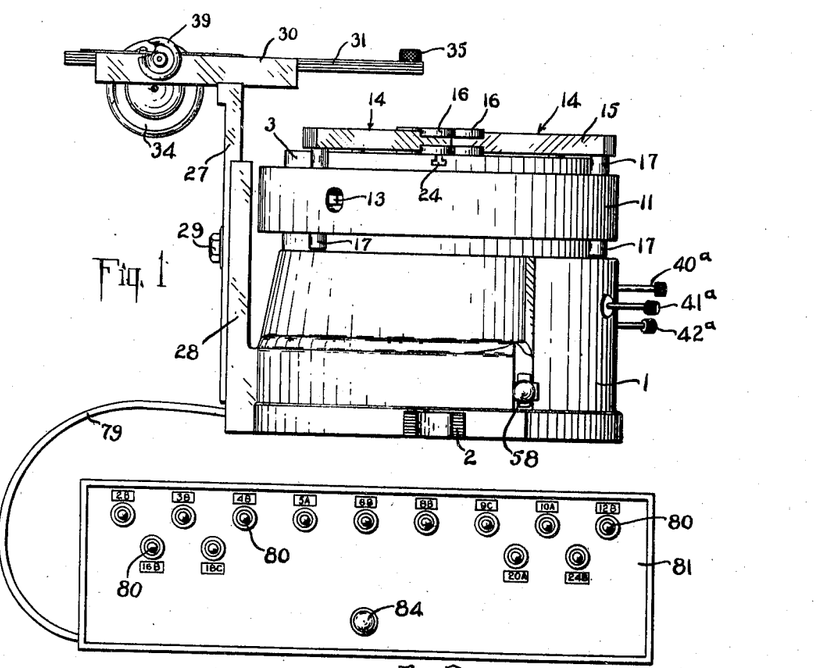
Figure 1 is a side elevation of the improved universal drill jig, showing the control panel.
Figure 2:
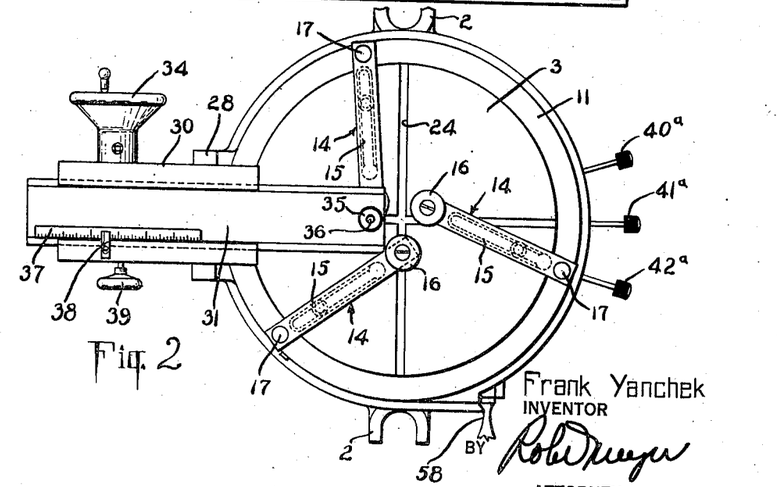
Figure 2 is a top plan of the universal drill jig.
Figure 3:
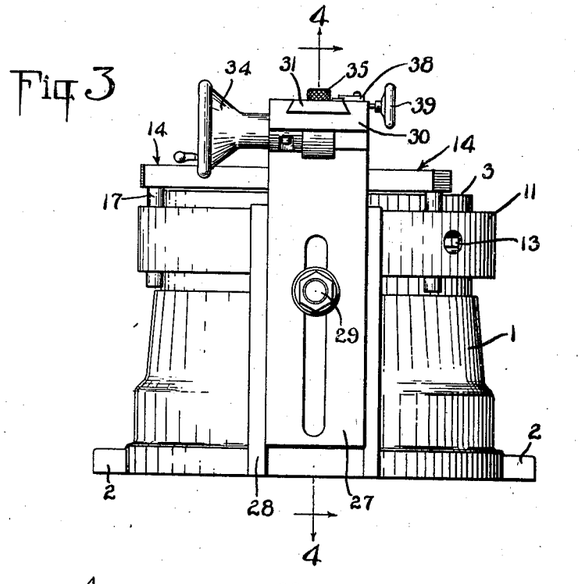
Figure 3 is a side elevation of the universal drill jig, looking at right angles to Figure 1.

A stationary drum 70 is carried by a suitable support 71, which is in turn carried by the stationary housing 1. The drum 70 is positioned axially within the indicator cylinder 65 and is made up of a plurality of discs 72, one disc being provided for each of the thirteen sets or circles of indicator contact pins 68. The discs 72 are insulated, one from the other, by means of suitable insulation discs 73, and they are bound together and to the support 71 by suitable bolts 74, which are enclosed in suitable insulation 75. Each of the discs 72 carries a contact pin 76, slidably supported by the disc and urged outwardly for contact with the cooperating stationary contact pins 68 by a spring 77. The outward movement of the pins 76 is limited by suitable stops 78, as clearly shown in Figures 6 and 7 of the drawings. Each of the discs 72 is made of electrical conducting material, and has one wire of an electrical circuit connected thereto, such wires being indicated at 79. The various wires are connected, each to one of the poles of an electrical switch, such switches being shown in diagram in Figure 5 of the drawings, and at 80 in Figure 1 of the drawings, on the switch box 81. One such switch 80 is provided for each of the discs 72. The poles of the switches 80 which are not connected to the wires 79 and thus to the discs 72, are connected to one wire or side of the electrical current supply line, as indicated at 83. The other side of the electrical current supply line is connected through a signal mechanism, shown in the drawings as a light bulb 84, and through the wire 85 to the spring contact 86, which engages the inner wall of the indicating cylinder 65 so that when any one of the switches 80 is closed, the electrical current will flow through one of the wires 79, through the disc 72 to which said wire 79 is connected, through the movable contact pin 76 carried by the disc, and through the corresponding stationary pin 68 with which the pin 76 contacts, through the cylinder 65, the spring contact 86, the wire 85, the light or indicator 84, back to the main line or current supply, thus completing the circuit and operating the signal 84. Thus the operator of the universal drill jig will know that the table 3 and the work thereon has reached one of the accurately predetermined positions at which he desires to drill a hole in the work, the said position being determined by the switch 80 of the set of switches which he has operated.

An example of the operation of the universal drill rig is as follows: referring to Figure 17 of the drawings, wherein a circular piece is shown, to be drilled, say with an outer bolt ring of six drilled holes of a definite size, for instance ¾", the bolt circle to be of a 5" diameter, and a second series of three holes, say of ¼" diameter, drilled on a 2½" bolt circle.

Preparatory to such drilling the piece 90 is placed on the top of the table 3 and the ring 11 rotated so that the centering members 14 engage the circular perimeter of the piece 90 and will accurately center the piece on the table, where it is then clamped in position by means of the clamps 25. Since the series of six ¾" holes are to be drilled on a 5" bolt circle, that is, in a circle having a 2½" radius from the center of the piece 90, the drill guiding slide 31 is moved, employing the scale 37, to indicate 2½" on the scale, which will position the center or axis of the drill guiding bushing 35 exactly 2½" from the center of the table 3 and the center of the piece 90. A bushing 35 to accommodate a ¾" drill is then inserted in the slide 31.

The operator, wishing to drill six holes, will operate or close the switch 80, indicated at 6B on the panel 81, which will connect the disc 72 of the series of discs in the drum 70 in an electrical circuit, which circuit however will not be closed until the turret, including the cylinder 4 and table 3, has been rotated to bring the first one of the pins 68 in the set of six stationary pins in contact with the pin 76 in the disc 72. When the first of the six stationary pins 68 in the set of six contacts with the pin 76 carried by the corresponding disc 72, the electrical circuit will be closed through the signal 84, at which time the operator will release the proper index holding pin for engagement in the notch 43 in the index ring having the proper positioned and number of notches in its perimeter. In the present instance, where six holes are to be drilled, it would be the index ring 40. The release of the index positioning pin 40ª and the engagement of its wedge end 48 in the proper notch in the ring 40 would positively position the piece 90 at the exact proper point for drilling, and overcome or correct any inaccuracies which would be provided through the contacting of the electric current closing pins 68 and 76. After the index pin has been inserted in the proper notch to position the table 3, the brake 55 is operated to securely lock the turret consisting of the cylinder 4 and the table 3 in the adjusted position, after which the first hole is drilled in the piece 90. After the hole has been drilled, the brake 55 is released, the index plunger 40ª withdrawn from its position with its wedge end 48 in the notch 43 of the index ring, and the turret is rotated. As soon as the turret is moved, the electrical contact through the pins 68 and 76 is broken and the circuit through the signal 84 is broken. Since the switch 6B is closed, when the next successive pin 68 of the set of six contact pins contacts the pin 76 carried by the disc 72 which is connected to the switch 6B, the indicator 84 will again be actuated, advising the operator that the position for the second hole has been reached. Then he again releases the index pin 40ª, locks the brake 55, and proceeds with the drilling. This operation is repeated until all six of the holes in the outer ring or circle have been drilled.

Figure 17:
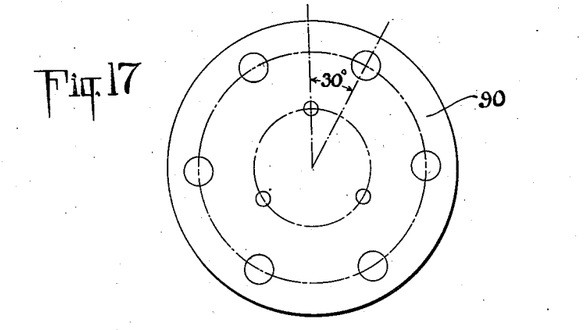
Figure 17 is a diagrammatic view of a piece of work to be drilled with holes on two bolt circles.

It will be noted by reference to Figure 17 of the drawings that the three holes in the inner bolt circle are positioned radially at 30° angle to the radii bisecting the centers of the holes in the larger or 5" bolt circle, and to accurately position these holes in the inner circle in the desired relation to the holes in the outer circle, the operator will open the switch 6B, and close the switch 12B. Then, by rotating the turret, consisting of the cylinder 4 and the table 3, until the signal 84 is actuated, the operator will be enabled, by inserting the indicator plunger or pin into the proper notch in the index ring which corresponds to 12B, namely index pin 40ª, to accurately locate the first hole of the inner circle with its center exactly half-way between the centers of two of the holes in the outer circle, or on a radius bisecting the angle between two of the radii on which the centers of the holes in the outer circle are drilled, the angle between them being 30°. The turret is then locked in position by means of the brake 55, and the slide 31 is operated to move the center of the bushing 35 exactly 1¼" from the center of the piece 90, in the same manner in which it was adjusted to determine the radius of the outer bolt circle. The bushing 35 is then replaced with a bushing to fit the drill to be used, a ¼" drill.

The switch 12B is then opened, and the switch 3B closed, since it is desired to drill only three holes on the radius of the inner circle. The operator then drills the first of these three holes, after which he releases the brake 55, withdraws the index pin 40a, and rotates the turret until the next successive pin in the set of three pins contacts with the pin 76 carried by the disc 72 which cooperates with said set of three pins, at which time the signal 84 operates. He then again sets the indicating plunger to accurately position the work, locks the turret in place, and proceeds with the drilling, going through the same operation until all three of the holes have been drilled.

A similar operation would of course be possible if the holes in the circles were to be placed, say with the radii bisecting the centers of one circle or series of holes at 45° to the radii bisecting the centers of the holes in the other circle, depending upon the number of holes to be drilled in each circle as to which of the switches would be operated. This location and patterning of the holes is simple with the present jig because the first contact pins of each set on the indexing cylinder 65 are in a straight vertical line, and the fifth set from the top has, say six pins, while the ninth set has twelve pins, etc., as pointed out in the above description. Therefore every other contact pin in the ninth set will be in between or centered between the contact pins in the fifth set, with the same relation existing between the other sets, which gives a wide variety of accurate positions for the setting of the piece to be drilled.

From the foregoing it will be seen that an operator of the universal drill jig of the present invention may drill any number of holes, from two to twenty-four, in any number of circles, with the holes in the various individual circles at any desired position relative to the holes in the other circles, without once removing the piece of work to be drilled from the jig and without dismantling or making any changes or replacements in the jig, it only being necessary to close and open the switches 80 and to operate the respective index plungers and the brake 55. By provision of the indicator 84 and the index plungers or pins and the index rings, the device is practically foolproof, and not only notifies the operator when the proper adjustment is reached, but fixes the adjustment with absolute accuracy.

Figure 18:
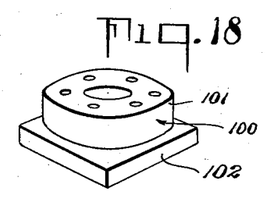
Figure 18 is a perspective view of an irregular piece to be drilled, such as can be set and drilled on the universal drill jig.
Figure 19:
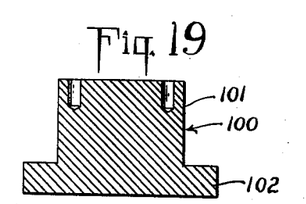
Figure 19 is a section through the piece shown in Figure 18.
Figure 20:
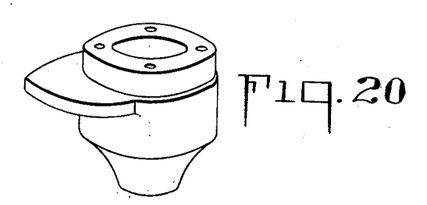
Figure 20 is a perspective view showing another irregularly shaped piece which may be drilled on the universal drill jig.
Figure 21:
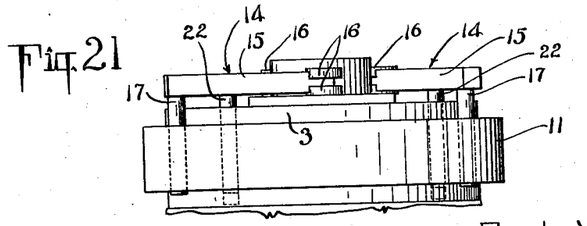
Figure 21 is a view partly in section and partly in elevation, illustrating the manner of adjustment of the centering members of the rig when used in connection with a piece of irregular contour such as that shown in Figures 18 and 19.

The universal drill jig is also applicable for use in connection with pieces to be drilled that are of irregular contour, such as those shown in Figures 18, 19 and 20 of the drawings. When drilling circular pieces having a rectangular flange, such as shown in Figure 18, it would be impossible to properly center such a piece for drilling with a jig employing chuck jaws of approved construction. However, such a piece can be accurately centered on the present jig. When a piece such as that illustrated in Figures 18 and 19 is to be drilled, the centering devices 14 are moved upwardly, as well as outwardly, to permit the placing of the piece 100 on the table 3, after which the centering members 14 are positioned so that the peripheries of their rollers will align with the perimeter of the circular portion 101 of the piece 109. Thus, when the ring 11 is rotated, as heretofore described, the piece 100 will be accurately centered, the centering devices or members acting upon the circular surface 100, rather than the irregular or rectangular portion 102. The same is true of pieces of various other irregular shapes, such as that shown in Figure 20 of the drawings, and in every instance of such irregular pieces being drilled, the centering members 14 are adjusted vertically so that their rollers will engage the perimeter of the circular portion of the piece to be drilled, and thus, regardless of any other shapes of the piece, it may be accurately centered and accurately drilled, on the present drill jig.

It will be understood that the invention is not to be limited to the specific construction or arrangement of parts shown, but that they may be widely modified within the invention defined by the claims.

What is claimed is:

1. In a universal drill jig, a carrying body, a cylinder rotatably carried by said carrying body, a work supporting table carried by and movable with said cylinder, a plurality of centering members on said table, a ring supported by said cylinder for rotary movement independently of the cylinder and movement with the cylinder, and means connecting said centering members to said ring and cylinder whereby the centering members may be moved to various spaced positions relative to the work carrying face of the table without disconnecting the centering members from the ring and cylinder.

2. In a universal drill jig, a carrying body, a cylinder rotatably carried by said carrying body, a work supporting table carried by and movable with said cylinder, a plurality of centering members on said table, a ring supported by said cylinder for rotary movement independent of the cylinder and movement with the cylinder, means connecting said centering members to said ring and cylinder whereby the centering members may be moved to various spaced positions relative to the work carrying face of the table without disconnecting the centering members from the ring and cylinder, index means carried by said cylinder, and means carried by said carrying body and cooperating with said cylinder carried index means for holding the cylinder and table in predetermined adjusted positions.

3. In a universal drill jig, a carrying body, a cylinder rotatably carried by said carrying body, a work supporting table carried by and movable with said cylinder, a plurality of centering members on said table, a ring supported by said cylinder for rotary movement independently of the cylinder and movement with the cylinder, means connecting said centering members to said ring and cylinder whereby the centering members may be moved to various spaced positions relative to the work carrying face of the table without disconnecting the centering members from the ring and cylinder, index means carried by said cylinder, means carried by said carrying body and cooperating with said cylinder carried index means for holding the cylinder and table in predetermined adjusted positions, and indicating means associated with said cylinder for indicating when the cylinder and table reach selected predetermined positions.

4. In a universal drill jig, a carrying body, a work supporting table movably carried thereby, a drill guide adjustable relative to said table, means for holding said work supporting table in selected predetermined positions relative to said drill guide to accurately position a piece to be worked upon, a plurality of sets of electrical contacts corresponding to a predetermined number of settings of said table, selective means for selecting the set of contacts to correspond with the lay-out to be drilled, and an indicator connected in circuit with said contacts, said contacts and selective means associated with said movable table whereby whenever the table reaches one of the selected positions of the selected set of contacts said indicator will be operated.

5. In a universal drill jig, a carrying body, a work supporting table movably carried by said body, index means movable with said table for holding the table in any selected one of a plurality of predetermined positions, a plurality of sets of electrical contacts corresponding to the positions provided by said index means, selective means for selecting the set of contacts to correspond with a desired sequence of indexed positions for adjustment of the table, an indicator connected in circuit with said sets of contacts whereby whenever the table reaches one of the selected predetermined positions said indicator will be operated.

6. In a universal drill jig, a carrying body, a work supporting table movably carried by said body, index means movable with said table for holding the table in any selected one of a plurality of predetermined positions, a plurality of sets of electrical contacts corresponding to the positions provided by said index means, selective means for selecting the set of contacts to correspond with a desired sequence of indexed positions for adjustment of the table, an indicator connected in circuit with said sets of contacts whereby whenever the table reaches one of the selected predetermined positions said indicator will be operated, and mechanical means cooperating with said index means for arresting movement of the work supporting table in selected positions and accurately positioning it with respect to the drill guide.

7. In a universal drill jig, a carrying body, a work supporting table adjustably carried by said body, a drill guide adjustably carried by said body for movement in planes parallel to and perpendicular to the work supporting face of said table, index means associated with and movable with said table whereby said table may be accurately held in any selected one of a plurality of positions with respect to said drill guide, means carried by said body and cooperating with said index means for holding the table in the selected predetermined position, a plurality of sets of electrical contacts associated with and movable with said table, said sets of contacts corresponding with the positions provided by said index means, a plurality of stationary electrical contacts for cooperation with said sets of movable contacts, and selective means connected to said stationary contacts to permit selection of the stationary contact and the set of contacts which will be energized during adjusting movement of the table, an indicator in circuit with said sets of contacts whereby when said table reaches a selected predetermined position said indicator will be operated.

8. In a universal drill jig, a carrying body, a work supporting table adjustably carried by said body, a drill guide adjustably carried by said body for movement in planes parallel to and perpendicular to the work supporting face of said table, index means associated with and movable with said table whereby said table may be accurately held in any selected one of a plurality of positions with respect to said drill guide, means carried by said body and cooperating with said index means for holding the table in the selected predetermined position, a plurality of sets of electrical contacts associated with and movable with said table, said sets of contacts corresponding with the positions provided by said index means, a plurality of stationary electrical contacts for cooperation with said sets of movable contacts, selective means connected to said stationary contacts to permit selection of the stationary contact and the set of contacts which will be energized during adjusting movement of the table, an indicator in circuit with said sets of contacts whereby when said table reaches a selected predetermined position said indicator will be operated, and means for locking said table in the selected positions.

9. In a universal drill jig, a carrying body, a work supporting table movably carried by said body, a plurality of centering arms upon said table for centering a piece of work thereon, said arms being adjustable in unison radially of the axis of the table and means connecting said arms to said table to permit independent adjustment of the arms at right angles to the working face of the table whereby each arm may be positioned in various elevations above the supporting face irrespective of the elevational position of any of the other arms.

10. In a universal drill jig, a carrying body, a work supporting table movably carried by said body, a plurality of centering arms pivotally connected to said carrying body and resting upon and connected to said table for movement in unison radially of the axis of the table upon movement of the table relative to the carrying body, and means slidably engaging said body and table and connecting said arms to said body and table to permit independent movement of the arms towards or away from the table in a direction transversely of their radial movement.

11. In a universal drill jig, a carrying body, a cylinder rotatably carried by the carrying body, a work supporting table carried by and movable with said cylinder, a plurality of centering arms, a ring supported by said cylinder for rotary movement independently of the cylinder and movement with the cylinder, means pivotally connecting said arms to said ring, and means connecting said arms to the table whereby the arms will be moved pivotally over the surface of the table upon relative movement of the ring and table.

12. In a universal drill jig, a carrying body, a cylinder rotatably carried by the carrying body, a work supporting table carried by and movable with said cylinder, a plurality of centering arms, a ring supported by said cylinder for rotary movement independently of the cylinder and movement with the cylinder, means pivotally connecting said arms to said ring, and means connecting said arms to the table whereby the arms will be moved pivotally over the surface of the table upon relative movement of the ring and table, the means connecting said arms to said ring and to said table being constructed to provide sliding fits respectively with the ring and table to permit independent movement of the arms towards or away from the table in a direction transversely of their radial movement.

13. In a universal drill jig, a carrying body, a cylinder rotatably carried by the carrying body, a work supporting table carried by and movable with said cylinder, a plurality of centering arms, a ring supported by said cylinder for rotary movement independently of the cylinder and movement with the cylinder, means pivotally connecting said arms to said ring, means connecting said arms to the table whereby the arms will be moved pivotally over the surface of the table upon relative movement of the ring and table, the means connecting said arms to said ring and to said table being constructed to provide sliding fits respectively with the ring and table to permit independent movement of the arms towards or away from the table in a direction transversely of their radial movement, and manually released means cooperating with said table for arresting movement of the table in selected positions.

14. In a universal drill jig, a carrying body, a cylinder rotatably carried by the carrying body, a work supporting table carried by and movable with said cylinder, a plurality of centering arms, a ring supported by said cylinder for rotary movement independently of the cylinder and movement with the cylinder, means pivotally connecting said arms to said ring, means connecting said arms to the table whereby the arms will be moved pivotally over the surface of the table upon relative movement of the ring and table, the means connecting said arms to said ring and to said table being constructed to provide sliding fits respectively with the ring and table to permit independent movement of the arms towards or away from the table in a direction transversely of their radial movement, manually released means cooperating with said table for arresting movement of the table in selected positions, and means for locking the table in selected positions.

15. In a universal drill jig, a carrying body, a work supporting table movably carried by said body, a drill guide adjustably carried by said body, means for centering a piece to be worked upon on said table, a plurality of index rings movable with said table and each provided with a plurality of peripheral notches representing predetermined relative positions of the table and drill guide, the notches in each ring being spaced at different segmental positions than the notches of the other rings, means carried by said body and co-acting with said notches to arrest movement of the table to accurately position the piece to be worked upon, and indicia means having indicating units corresponding to said notches to indicate when the table reaches predetermined positions.

16. In a universal drill jig, a carrying body, a work supporting table movably carried by said body, a drill guide adjustably carried by said body, means for centering a piece to be worked upon on said table, a plurality of index rings movable with said table and each provided with a plurality of peripheral notches representing predetermined relative positions of the table and drill guide, the notches in each ring being spaced at different segmental positions than the notches of the other rings, means carried by said body and co-acting with said notches to arrest movement of the table to accurately position the piece to be worked upon, indicia means having indicating units corresponding to said notches, and selective means for setting said indicia means to indicate in sequence when the table reaches each of a series of predetermined positions.

17. In a universal drill jig, a carrying body, a work supporting table movably carried by said body, a drill guide adjustably carried by said body, means for centering a piece to be worked upon on said table, a plurality of index rings movable with said table and each provided with a plurality of peripheral notches representing predetermined relative positions of the table and drill guide, the notches in each ring being spaced at different segmental positions than the notches of the other rings, means carried by said body and co-acting with said notches to arrest movement of the table to accurately position the piece to be worked upon, and electrical indicating means associated with said index rings and visibly indicating when predetermined positions of said index means are reached during movement of the table, said electrical means comprising a plurality of independent indicators corresponding to the notches in said rings, stationary contacts carried by said carrying body, contacts carried by said table and movable therewith for engagement with the body carried contacts for energizing said indicators.

18. In a universal drill jig, a carrying body, a work supporting table movably carried by said body, a drill guide adjustably carried by said body, means for centering a piece to be worked upon on said table, a plurality of index rings movable with said table and each provided with a plurality of peripheral notches representing predetermined relative positions of the table and drill guide, the notches in each ring being spaced at different segmental positions than the notches of the other rings, means carried by said body and co-acting with said notches to arrest movement of the table to accurately position the piece to be worked upon, electrical indicating means associated with said index rings and visibly indicating when predetermined positions of said index means are reached during movement of the table, said electrical means comprising a plurality of independent indicators corresponding to the notches in said rings, stationary contacts carried by said carrying body, contacts carried by said table and movable therewith for engagement with the body carried contacts for energizing said indicators, and settable selective means for controlling energizing of the indicators whereby only predetermined positions of the table selected by said selective means will be indicated by said indicators.

19. In a universal drill jig, a carrying body, a work supporting table movably carried by said body, a plurality of centering arms pivotally connected to said carrying body and resting upon and connected to said table for movement in unison radially of the axis of the table upon movement of the table relative to the carrying body, said arms connected to said body and table to permit independent movement of the arms towards or away from the table in a direction transversely of their radial movement, a plurality of index rings movable with said table and each provided with a plurality of peripheral notches representing predetermined relative positions of the table and drill guide, the notches in each ring being spaced at different segmental positions than the notches in the other rings, and means carried by said body and co-acting with said notches to arrest movement of the table to accurately position a piece to be worked upon.

20. In a universal drill jig, a carrying body, a work supporting table movably carried by said body, a plurality of centering arms pivotally connected to said carrying body and resting upon and connected to said table for movement in unison radially of the axis of the table upon movement of the table relative to the carrying body, said arms connected to said body and table to permit independent movement of the arms towards or away from the table in a direction transversely of their radial movement, a plurality of index rings movable with said table and each provided with a plurality of peripheral notches representing predetermined relative positions of the table and drill guide, the notches in each ring being spaced at different segmental positions than the notches in the other rings, means carried by said body and co-acting with said notches to arrest movement of the table to accurately position a piece to be worked upon, indicia means having indicating units corresponding to said notches, and selective means for setting said indicia means to indicate in sequence when the table reaches each of a series of predetermined positions.

21. In a universal drill jig, a carrying body, a work supporting table movably carried by said body, index means movable with said table for holding the table in any selected one of a plurality of predetermined positions, a plurality of sets of electrical contacts corresponding to the positions provided by said index means, selective means for selecting the set of contacts to correspond with a desired sequence of indexed positions for adjustment of the table, an indicator connected in circuit with said sets of contacts whereby whenever the table reaches one of the selected predetermined positions said indicator will be operated, said index means comprising a plurality of index rings each provided with a plurality of peripheral notches representing predetermined relative positions of the table and drill guide, the notches in each ring being spaced at different segmental positions in the circumference of the ring than the notches of the other rings, and manually released means carried by said body for engagement in said notches for arresting movement of the table in selected positions.

22. In a universal drill jig, a carrying body, a work supporting table movably carried by said carrying body, a plurality of work centering members on said table, a ring rotatably carried by said body, means connecting said centering members to said ring and table in such manner as to permit pivotal movement of the centering members relative to the table upon relative movement of the ring and table, and means connecting the ring and table to provide limited movement of the ring relative to the table upon movement of the table relative to the carrying body.

23. In a universal drill jig, a carrying body, a work supporting table movably carried by said carrying body, a plurality of work centering members on said table, a ring rotatably carried by said body, means connecting said centering members to said ring and table in such manner as to permit pivotal movement of the centering members relative to the table upon relative movement of the ring and table, means connecting the ring and table to provide limited movement of the ring relative to the table upon movement of the table relative to the carrying body, said centering member connecting means being constructed and arranged to permit independent movement of the centering members relative to the ring and table in a direction transversely of their pivotal movement.

24. In a universal drill jig, a carrying body, a work supporting table movably carried by said body, a plurality of centering arms upon said table for centering a piece of work thereon, means connecting said centering members to said table in such manner as to permit pivotal movement of the centering members relative to the table, said centering member connecting means being constructed and arranged to permit independent movement of the centering members relative to the table in a direction transversely of their pivotal movement.

25. In a universal drill jig, a carrying body, a work supporting table movably carried by said body, a drill guide adjustably carried by said body, means for centering a piece to be worked upon upon said table, an index ring movable with said table and provided with a plurality of peripheral notches representing predetermined relative positions of the table and drill guide, means carried by said body and co-acting with said notches to arrest movement of the table to accurately position the piece to be worked upon, and indicia means having indicating units corresponding to said notches to indicate when the table reaches predetermined positions.

26. In a universal drill jig, a carrying body, a work supporting table movably carried by said body, a drill guide adjustably carried by said body, means for centering a piece to be worked upon upon said table, an index ring movable with said table and provided with a plurality of peripheral notches representing predetermined relative positions of the table and drill guide, means carried by said body and co-acting with said notches to arrest movement of the table to accurately position the piece to be worked upon, indicia means embodying a plurality of electrically operated indicators corresponding to said notches, selective means settable to control independent energizing of said indicators, and means carried by said body and co-acting with said selective means for energizing the selected indicators when the table reaches positions of adjustment corresponding to the setting of said selective means.

27. In a universal drill jig, a carrying body, a work supporting table movably carried by said body, a drill guide adjustably carried by said body, means for centering a piece to be worked upon on said table, a plurality of index rings movable with said table and each provided with a plurality of peripheral notches representing predetermined relative positions of the table and drill guide, the notches in each ring being spaced at different segmental positions than the notches of the other rings, means carried by said body and co-acting with said notches to arrest movement of the table to accurately position the piece to be worked upon, and indicia means embodying a plurality of electrically operated indicators corresponding to said notches, selective means settable to control independent energizing of said indicators, and means carried by said body and co-acting with said selective means for energizing the selected indicators when the table reaches positions of adjustment corresponding to the setting of said selective means.

28. In a universal drill jig, a carrying body, a work supporting table movably carried by said body, index means movable with said table for holding the table in any one of a plurality of predetermined positions, indicia means embodying a plurality of electrically operated indicators corresponding to the plurality of predetermined positions provided by said index means, selective means settable to control independent energizing of said indicators, and means carried by said body and co-acting with said selective means for energizing the selected indicators when the table reaches positions corresponding to the setting of said selective means.

29. In a universal drill jig, a carrying body, a work supporting table movably carried by said body, a drill guide adjustably carried by said body, means for centering a piece to be worked upon on said table, an index ring movable with said table and provided with a plurality of peripheral notches representing predetermined relative positions of the table and drill guide, means carried by said body and co-acting with said notches to arrest movement of the table to accurately position the piece to be worked upon, indicia means embodying a plurality of electrically operated indicators corresponding to said notches, selective means settable to control independent energizing of said indicators, means carried by said body and co-acting with said selective means for energizing the selected indicators when the table reaches positions of adjustment corresponding to the setting of said selective means, and means carried by said carrying body and engageable in said notches to hold said table in the exact indicated position.

30. In a universal drill jig, a carrying body, a work supporting table movably carried by said body, a drill guide adjustably carried by said body, means for centering a piece to be worked upon on said table, an index ring movable with said table and provided with a plurality of peripheral notches representing predetermined relative positions of the table and drill guide, means carried by said body and co-acting with said notches to arrest movement of the table to accurately position the piece to be worked upon, indicia means embodying a plurality of electrically operated indicators corresponding to said notches, selective means settable to control independent energizing of said indicators, means carried by said body and co-acting with said selective means for energizing the selected indicators when the table reaches positions of adjustment corresponding to the setting of said selective means, means carried by said carrying body and engageable in said notches to hold said table in the exact indicated position, and means independent of said last-named means for locking said table in adjusted positions.

31. In a universal drill jig, a carrying body, a work supporting table movably carried by said carrying body, a plurality of work centering members on said table, means connecting said centering members to said table to permit pivotal movement of the members relative to the table, means connecting said members for unitary pivotal movement over the table, said means connecting said centering members to said table being constructed and arranged to permit limited longitudinal movement of the members relative thereto and to permit independent movement of each member transversely away from or toward the working face of the table.

FRANK YANCHEK.